United States Patent
Gan et al.

(10) Patent No.: US 6,987,679 B2
(45) Date of Patent: Jan. 17, 2006

(54) MULTIPLE OUTPUT CONVERTER WITH IMPROVED CROSS REGULATION

(75) Inventors: Hongjian Gan, Taoyuan (TW); Sen Dou, Tainan (TW); Alpha J. Zhang, Taoyuan (TW); Alex Jong, Taoyuan (TW); Chanwit Prasantanakorn, Samutprakarn (TH)

(73) Assignee: Delta Electronics, Inc., Taoyuan (TW)

( * ) Notice: Subject to any disclaimer, the term of this patent is extended or adjusted under 35 U.S.C. 154(b) by 19 days.

(21) Appl. No.: 10/465,138

(22) Filed: Jun. 18, 2003

(65) Prior Publication Data
US 2004/0257838 A1    Dec. 23, 2004

(51) Int. Cl.
*H02M 7/217*      (2006.01)

(52) U.S. Cl. .................. 363/89; 363/17; 363/21.06; 363/21.14; 363/127

(58) Field of Classification Search .............. 363/17, 363/21.06, 21.14, 89, 127
See application file for complete search history.

(56) References Cited

U.S. PATENT DOCUMENTS

| | | | |
|---|---|---|---|
| 6,434,026 B1 * | 8/2002 | Malik et al. .............. | 363/21.14 |
| 6,452,367 B2 * | 9/2002 | Watanabe ................... | 323/267 |
| 6,549,432 B1 * | 4/2003 | Giannopoulos et al. .. | 363/21.14 |
| 6,567,261 B2 * | 5/2003 | Kanouda et al. ............ | 361/502 |
| 6,744,642 B2 * | 6/2004 | Hung ....................... | 363/21.06 |
| 6,771,059 B1 * | 8/2004 | Zwicker ..................... | 324/119 |

* cited by examiner

*Primary Examiner*—Jeffrey Sterrett
(74) *Attorney, Agent, or Firm*—Perkins Coie LLP

(57) ABSTRACT

A cost effective circuit improves the cross regulation of multiple outputs converter, especially for that output chokes are coupled and a synchronous rectifier is applied to one of the outputs. A DC/DC converter includes a transformer having a primary winding and two secondary windings. The first secondary winding is coupled to a synchronous rectifier and a first output choke. The second secondary winding is coupled to a diode rectifier and a second output choke. The first output choke and the second output choke are coupled. A low power MOSFET switch is added to the diode rectifier for avoiding the diode rectifier operating in DCM when light loaded.

16 Claims, 5 Drawing Sheets

MULTIPLE OUTPUT CONVERTER WITH IMPROVED CROSS REGULATION

BACKGROUND OF THE INVENTION

1. Field of the Invention

This invention relates to output rectifier circuits of switching mode power supply, and more particularly to multiple outputs converter with synchronous rectifier and diode rectifier applied simultaneously.

2. Description of the Prior Art

DC/DC converters are commonly used to provide power for electronic devices such as computers, communication devices and personal digital assistants. A DC/DC converter converts a DC input voltage to a conditioned DC output voltage and then provides one or multiple output DC voltages. For example, for personal computer and networking applications, a DC/DC converter may be employed to convert a DC input voltage to provide three main output voltages (12V DC, 5V DC and 3.3V DC).

FIG. 1 illustrates a conventional multiple outputs forward converter. The forward converter includes the main power switch 20 coupled to the primary winding 10 of a transformer. In the illustrated embodiment, the main power switch is typically a power switching MOSFET. The forward converter has a first and second output channels to provide a first output voltage Vo1 and a second output voltage Vo2, respectively. Each of the two output channels includes the secondary winding (12, 14), the diode rectifier (30, 32 and 34, 36), an output choke (50, 52) and an output capacitor (60, 62). The two output chokes 50 and 52 are coupled with each other in one core for improving voltage cross regulation and achieving low cost design. The weighted voltage regulator 70 is provided to control the duty cycle of the main switch 20 and to regulate the first and second output voltages Vo1, Vo2.

One drawback of the forward converter in FIG. 1, however, is that the secondary windings 12, 14 and the output chokes 50, 52 could not be ideally coupled without leakage. Moreover, the forward drop voltages of the rectifier diodes decrease when their forward currents decrease. All these factors worsen the cross regulation, especially when one output channel is lightly loaded and the other one is full loaded.

An improvement to the forward convert in FIG. 1 is show in FIG. 2. In this circuit, the secondary windings 12 and 14 are stacked with each other. Compared with that shown in FIG. 1, the coupling of the windings, winding 14 and winding 12 plus winding 14 for the first and second output voltage Vo1 and Vo2 respectively, is well increased. And this benefits the cross regulation of the first and second output voltage Vo1 and Vo2.

FIG. 3 shows the stacked rectifiers for further improving the cross regulation, wherein the forward voltage drop of diodes 34 and 36 of the first output channel are reflected to the second output channel.

However, in these aforementioned circuits, the operation mode of the output chokes 50 and 52 influences the cross regulation of the converter. The cross regulation can be well satisfied only under continuous conduction mode (CCM).

With everlasting trend for lower output voltage requirement, synchronous rectifier has been more widely applied as secondary rectifier for high efficiency operating design. FIG. 4 shows a forward converter, in which the first output channel 501 employs a synchronous rectifier having MOSFETs 40 and 44, and the second output channel 502 employs a diode rectifier having the forward diode 30 and the freewheeling diode 32. The driver 80 is provided to drive the MOSFETs 40 and 44. Due to much lower conduction voltage drop of synchronous rectifier compared with that of diode rectifier, and due to the operation of continuous conduction mode (CCM) of the first output channel 501, there will be a severe cross regulation issue, resulting from different operating conditions of the two output channels 501, 502 at the worsen case of light load operation.

SUMMARY OF THE INVENTION

One objective of the present invention is to provide a multiple outputs converter to enhance the CCM mode operation for all the outputs of the multiple outputs converter to ensure satisfied cross regulation.

Another objective of the present invention is to provide a multiple outputs converter including at least one synchronous rectifier with improved cross regulation by applying a low power active switch to a diode rectifier.

In accordance with the present invention, according to one embodiment, the present invention provides a multiple outputs converter with improved cross regulation. The converter includes: a transformer including a primary winding, a first secondary winding and a second secondary winding; a first output channel including a synchronous rectifier connected to the first secondary winding for providing a first output voltage; a second output channel including a diode rectifier connected to the second secondary winding for providing a second output voltage; a switching element, connected in parallel with a freewheeling diode of the diode rectifier, configured to ensure the second output channel to operate in continuous current mode; and a driver connected to the synchronous rectifier for driving the synchronous rectifier and the switching element.

According to another embodiment, a multiple outputs converter with improved cross regulation is provided. The converter includes: a transformer having a primary winding and a plurality of secondary windings; a plurality of output channels for providing a plurality of outputs, each of the plurality of output channels coupled to one of the plurality of secondary windings respectively, at least one of the plurality of output channels using a synchronous rectifier while all the other of the plurality of output channels using diode rectifiers, wherein each of the other of the plurality of output channels further comprises a switching element connected in parallel with a freewheeling diode of each of the diode rectifiers, configured to ensure the other of the plurality of output channels to operate in continuous current mode; and a driver connected to the synchronous rectifier for driving the synchronous rectifier and the switching elements of each of the other of the plurality of output channels.

According to another embodiment, a method for improving cross regulation of a multiple outputs converter is provided. The converter includes: a plurality of output channels for providing a plurality of outputs, each of the plurality of output channels coupled to one of a plurality of secondary windings respectively, at least one of the plurality of output channels using a synchronous rectifier while all the other of the plurality of output channels using diode rectifiers. The method comprises: providing each of the other of the plurality of output channels with a switching element, the switching element connected in parallel with a freewheeling diode of each of the diode rectifiers, configured to ensure the other of the plurality of output channels to operate in continuous current mode.

BRIEF DESCRIPTION OF THE DRAWINGS

For a more complete understanding of the present invention, reference is now made to the following descriptions taken in conjunction with the accompanying drawings, in which.

DESCRIPTION OF THE PREFERRED EMBODIMENT

Figure 1:
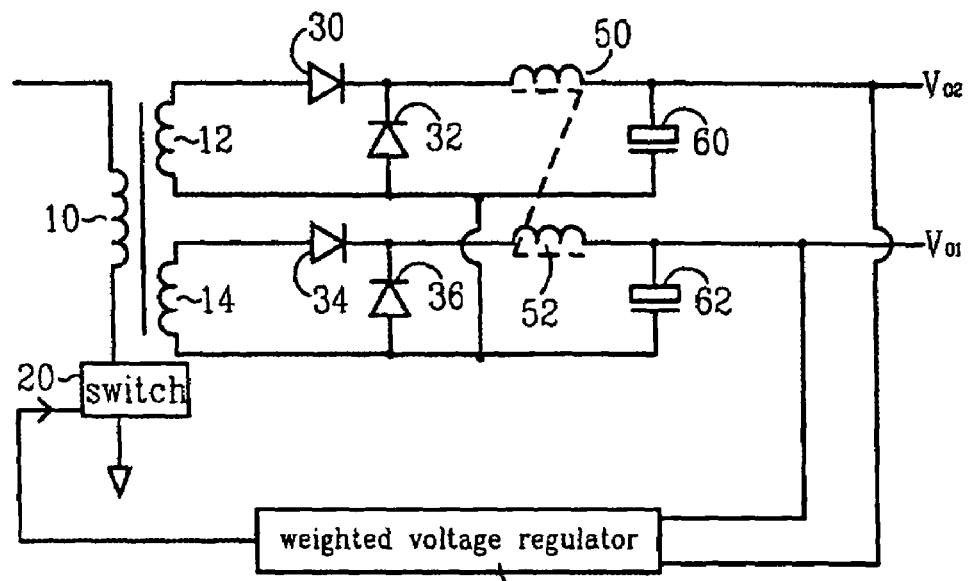
FIG. 1 is a schematic diagram of a circuit showing a conventional multiple outputs forward converter in accordance with the prior art.
Figure 2:
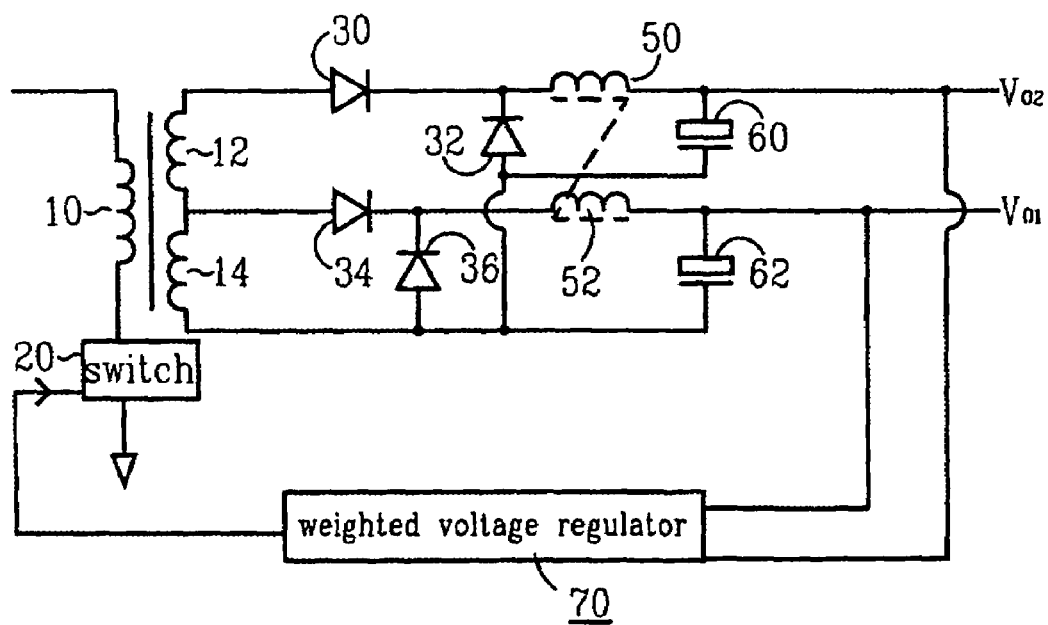
FIG. 2 is a schematic diagram of a circuit showing a conventional multiple outputs forward converter with stacked secondary windings in accordance with the prior art.
Figure 3:
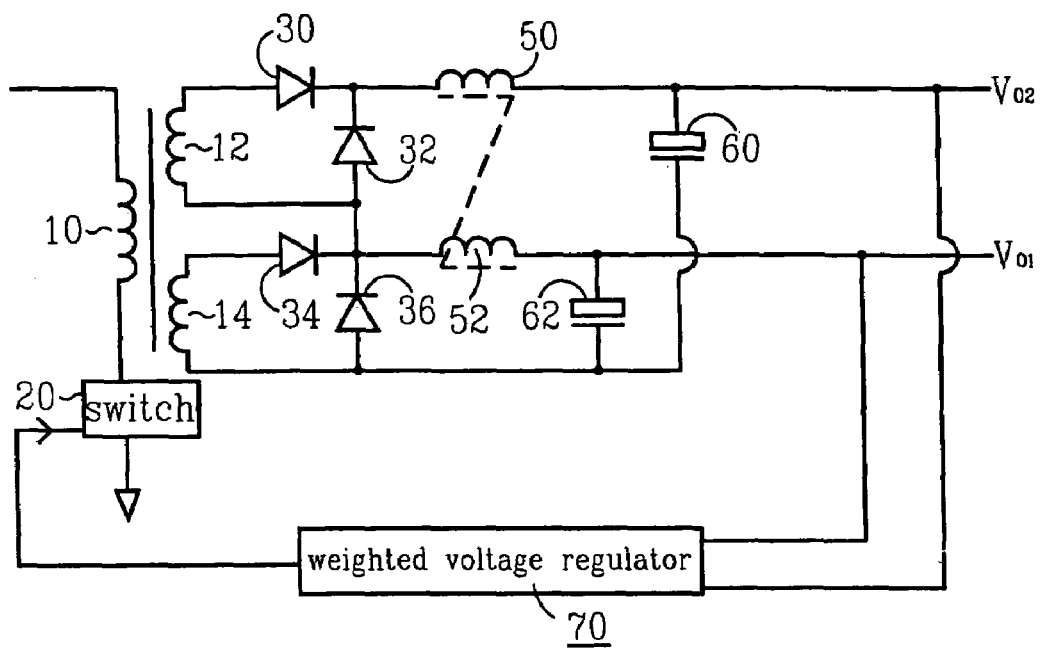
FIG. 3 is a schematic diagram of a circuit showing a conventional multiple outputs forward converter with its secondary windings and rectifiers stacked in accordance with the prior art.
Figure 4:
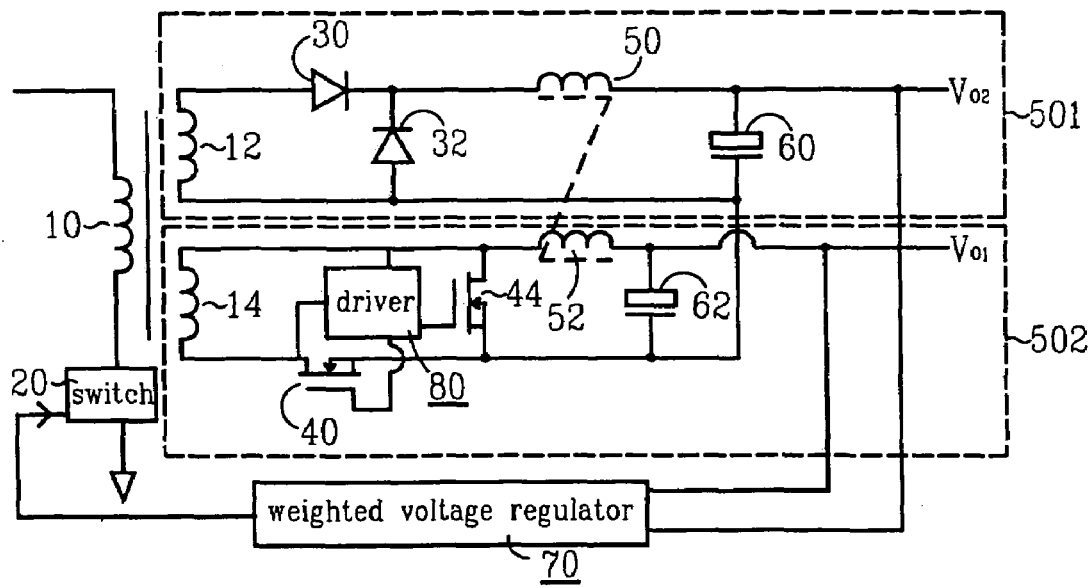
FIG. 4 is a schematic diagram of a multiple outputs forward converter with synchronous rectifier for high efficiency design in accordance with the prior art.
Figure 5:
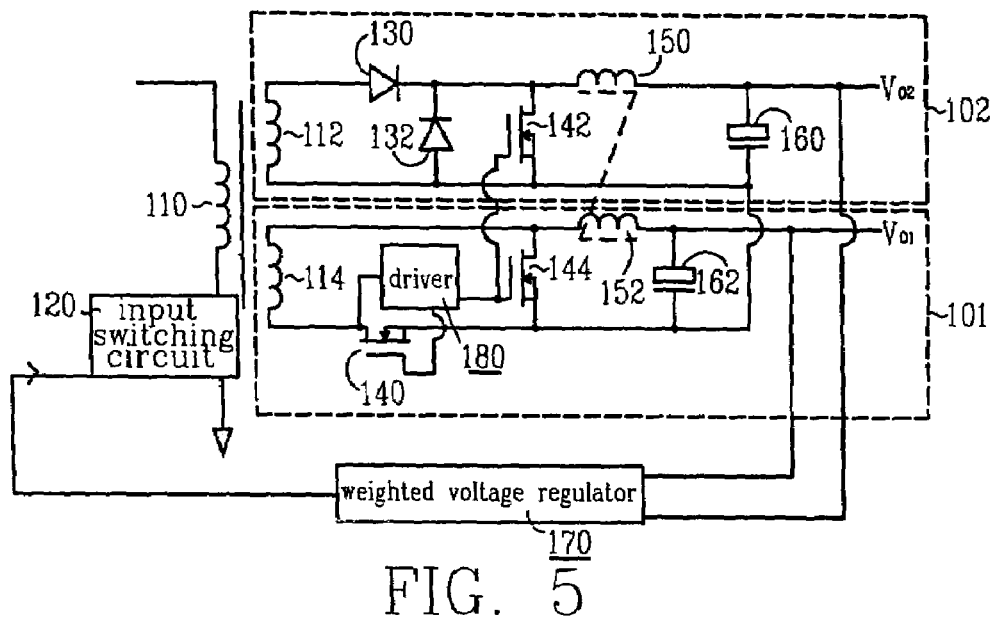
FIG. 5 is a schematic diagram of a two outputs converter with improved cross regulation according to a first alternate embodiment of the present invention.

Referring to FIG. 5, it illustrates a schematic diagram of a two outputs converter with improved cross regulation according to a first alternate embodiment of the present invention. The converter includes a transformer having the primary winding 110 coupled to the input switching circuit 120, the first secondary winding 114 and the second secondary winding 112. The input switching circuit 120 includes at least one power switch (unshown). The converter further includes a first output channel including a synchronous rectifier connected to the first secondary winding 114 for providing a first output voltage Vo1, and a second output channel including a diode rectifier connected to the second secondary winding 112 for providing a second output voltage Vo2. The synchronous rectifier of the first output channel includes the forward MOSFET 140 and the freewheeling MOSFET 144. The diode rectifier of the second output channel includes the forward diode 130 and the freewheeling diode 132.

A wide variety of input switching circuit 120 are suitable for using with the present invention, including but not limited to, a forward converter, a half bridge converter, an active clamp forward converter, a dual switch forward converter, or a full bridge converter.

The first output channel further includes a first filter having the first capacitor 162 and the first choke 152. The second output channel further includes a second filter having the second capacitor 160 and the second choke 150. The first and second chokes 152 and 150 are coupled with each other for cost effective and for improving the cross regulation of the first and second output voltages Vo1 and Vo2. The weighted voltage regulator 170 is provided to regulate the first and second output voltages Vo1 and Vo2 via a duty cycle control of the input switching circuit 120.

The unique aspect of the present invention is the use of the switching element 142, which is a low power active switch, connected in parallel with the freewheeling diode 132 of the diode rectifier of the second output channel and configured to ensure the second output channel to operate in continuous current mode (CCM). In the illustrated embodiment, the switching element 142 may typically be a comparatively smaller current rating MOSFET. Of course, other switching elements may be employed as the application dictates and are well within the broad scope of the present invention. The switching element 142 of the present invention performs as a CCM controller of the second choke 150 even when the second output channel is under open load condition. It is a low cost and simple method to improve the cross regulation of the first output voltage Vo1 and second output voltage Vo2.

The multiple outputs converter employing the switching element 142 of the present invention operates as follows. Because the first output channel includes the synchronous rectifier, the first output channel prefers at almost constant duty cycle even when the load of the first output channel changes from open load to full load. Once the first output channel is fully loaded and the second output channel is very light loaded, which is the worst condition for the cross regulation, the duties produced by the weighted voltage regulator 170 under the aforementioned conditions are almost the same. Therefore, the volt-second product inputting to the second output channel under any condition differs slightly from that when the second output channel is fully loaded. At the freewheeling time, the current of the second choke 150 can flow through the switching element 142 and thus the current can be bi-direction. This feature makes the second output channel always operate in CCM, even under a very light load, which is very helpful to ensure the good cross regulation of the first and second output voltages Vo1 and Vo2.

Due to the low power and comparatively smaller current rating of the switching element 142, when the second output channel is fully loaded, the freewheeling current mainly flows through the freewheeling diode 132 of the diode rectifier. Thus high power dissipation will never occurred in the switching element 142.

The first channel further includes the driver 180 connected to the synchronous rectifier for driving the forward MOSFET 140 and the freewheeling MOSFET 144. Also, the driver 180 can be used to drive the forward MOSFET 140, the freewheeling MOSFET 144 and the switching element 142 simultaneously.

Figure 6:
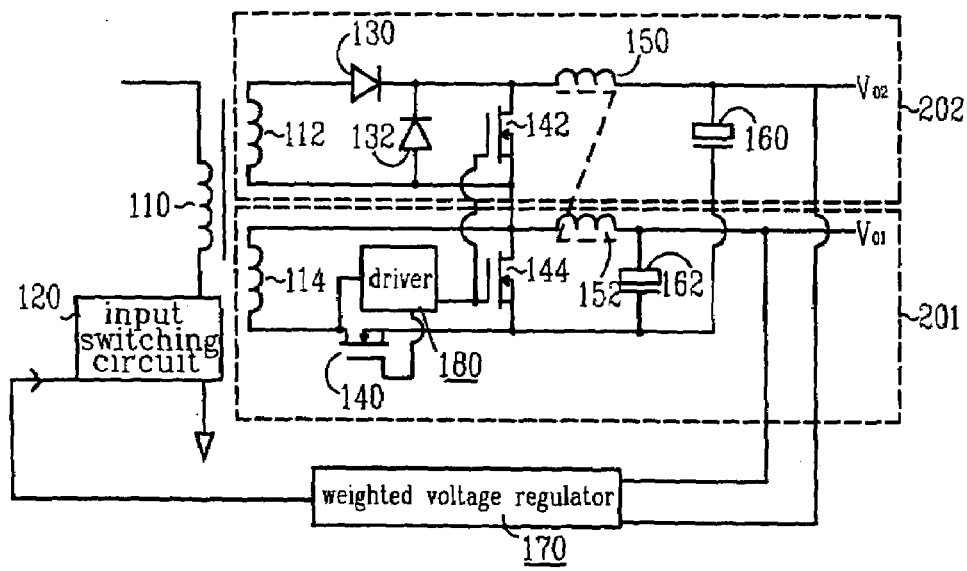
FIG. 6 is a schematic diagram of a two outputs converter with improved cross regulation according to a second alternate embodiment of the present invention.

FIG. 6 is a schematic diagram of a two outputs converter with improved cross regulation according to a second alternate embodiment of the present invention. The difference between the circuits in FIG. 6 and in FIG. 5 is that the diode rectifiers 130 and 132 of the second channel 202 is stacked over the synchronous rectifiers 140 and 144 of the first output channel 201, which will benefit to the cross regulation as mentioned before. Also, the circuit shown in FIG. 6 further improves the cross regulation due to the well coupled windings, herein the winding 114 and the winding 112 plus the winding 114 for the first and second output voltage Vo1 and Vo2 respectively.

The operation of the converter in FIG. 6 and that of other embodiments to be described below is analogous to the operation of the converter aforementioned and detailedly described in FIG. 5 and, as a result, the operation thereof will not be described again.

Figure 7:
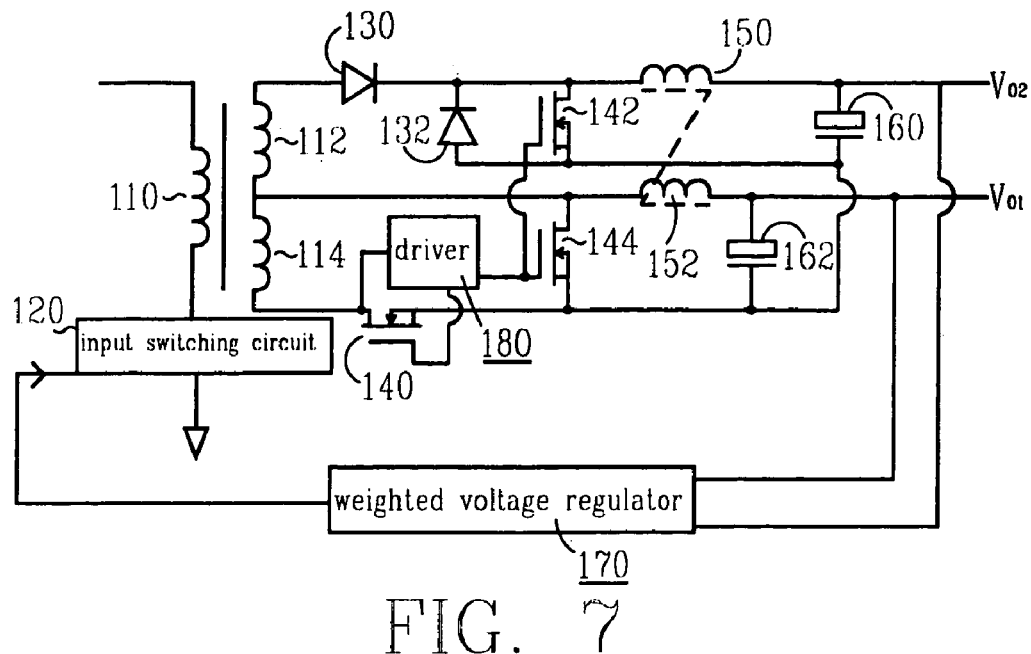
FIG. 7 is a schematic diagram of a two outputs converter with improved cross regulation according to a third alternate embodiment of the present invention.

FIG. 7 is a schematic diagram of a two outputs converter with improved cross regulation according to a third alternate embodiment of the present invention. An important improvement and aspect of this embodiment is that the first secondary winding 114 and the second secondary winding 112 are stacked. Compared with the circuit shown in FIG. 5, the coupling of the windings, herein the winding 114 and the winding 112 plus the winding 114 for the first and second output voltage Vo1 and Vo2 respectively, is well increased and so the cross regulation of the first output voltage Vo1 and the second output voltage Vo2 is improved.

Figure 8:
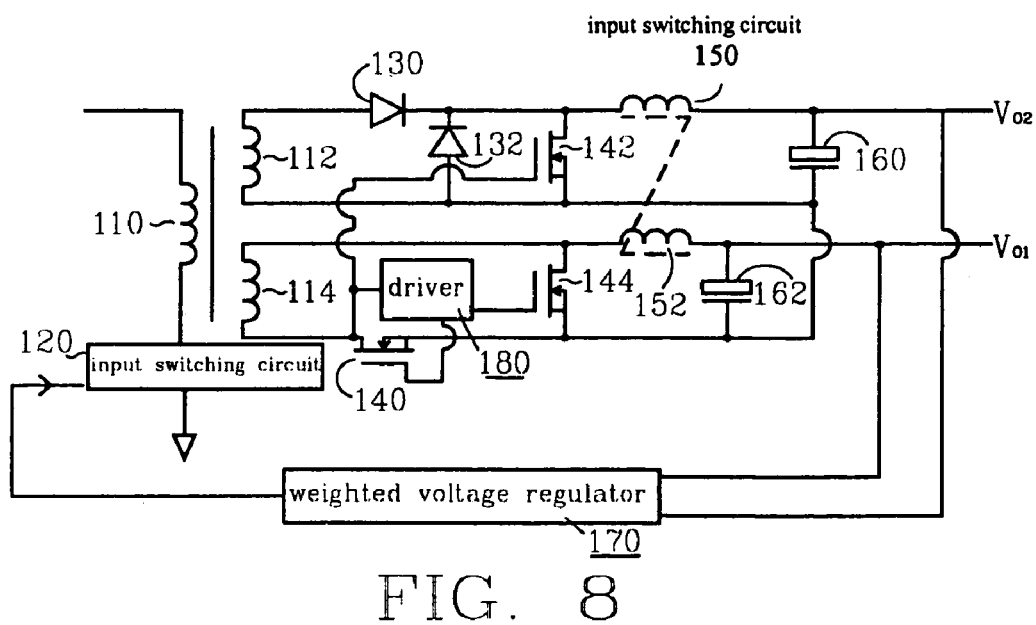
FIG. 8 is a schematic diagram of a two outputs converter with improved cross regulation according to a fourth alternate embodiment of the present invention.

FIG. 8 is a schematic diagram of a two outputs converter with improved cross regulation according to a fourth alternate embodiment of the present invention. The connection of the driver 180 to the switching elements in FIG. 5 can be adopted as that shown in FIG. 8. In FIG. 8, the driving of the switching element 142 is directly driven with the voltage of drain to source of the forward MOSFET 140 of the synchronous rectifier. The circuit shown in FIG. 8 still maintains both high rectifier efficiency and good cross regulation.

Figure 9:
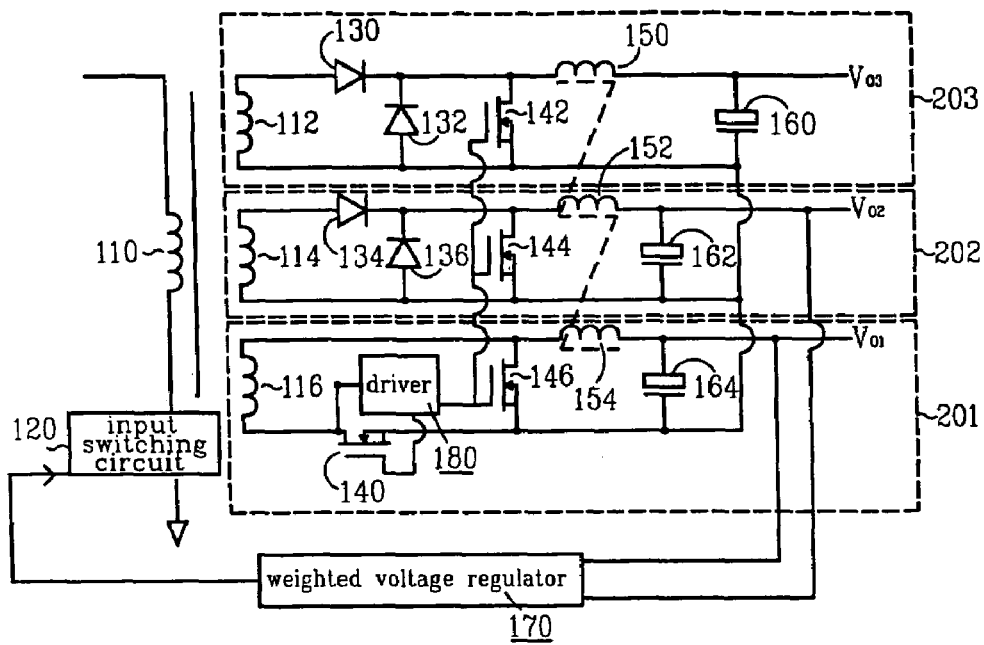
FIG. 9 is a schematic diagram of a multiple outputs converter with improved cross regulation according to a fifth alternate embodiment of the present invention.

Please refer to FIG. 9, a derivative art for the converters of FIG. 5 to FIG. 8 is proposed to satisfy multiple outputs converter applications. For the purpose of illustration, FIG. 9 illustrates an embodiment of the present invention, which employs only three outputs channels (i.e., 201, 202 and 203).

In FIG. 9, the multiple outputs converter includes a transformer having the primary winding 110 and a plurality of secondary windings (i.e., 116, 114 and 112), a plurality of output channels (i.e., 201, 202 and 203) for providing a plurality of output voltages (i.e., Vo1, Vo2 and Vo3). Each of the plurality of output channels (i.e., 201, 202 and 203) is coupled to one of the plurality of secondary windings respectively (i.e., the output channel 201 is coupled to the winding 116; the output channel 202 is coupled to the winding 114; and the output channel 203 is coupled to the winding 112). At least one of the plurality of output channels (i.e., 201) uses a synchronous rectifier while all the other of the plurality of output channels (i.e., 202, 203) use diode rectifiers. Each of the other of the plurality of output channels (i.e., 202, 203) further comprises a switching element (i.e., 144, 142) connected in parallel with a freewheeling diode (i.e., 136, 132) of each of the diode rectifiers, configured to ensure the other of the plurality of output channels (i.e., 202, 203) to operate in continuous current mode. The driver 180 is connected to the synchronous rectifier of the output channel 201 for driving the synchronous rectifier and the switching elements (i.e., 144, 142) of each of the other of the plurality of output channels (i.e., 202, 203). The weighted voltage regulator 170 is provided to regulate the multiple output voltages (i.e., Vo1, Vo2 and Vo3) via a duty cycle control of the input switching circuit 120.

In FIG. 9, even under the worst condition for the cross regulation that at least one load of the three output channels is full and the loads of the other output channels are very light, the duties produced by the weighted voltage regulator 170 are almost the same as that of normal. With the help of the switching elements 142 and 144, the cross regulation of the multiple output voltages (i.e., Vo1, Vo2 and Vo3) is still satisfied well.

Figure 10:
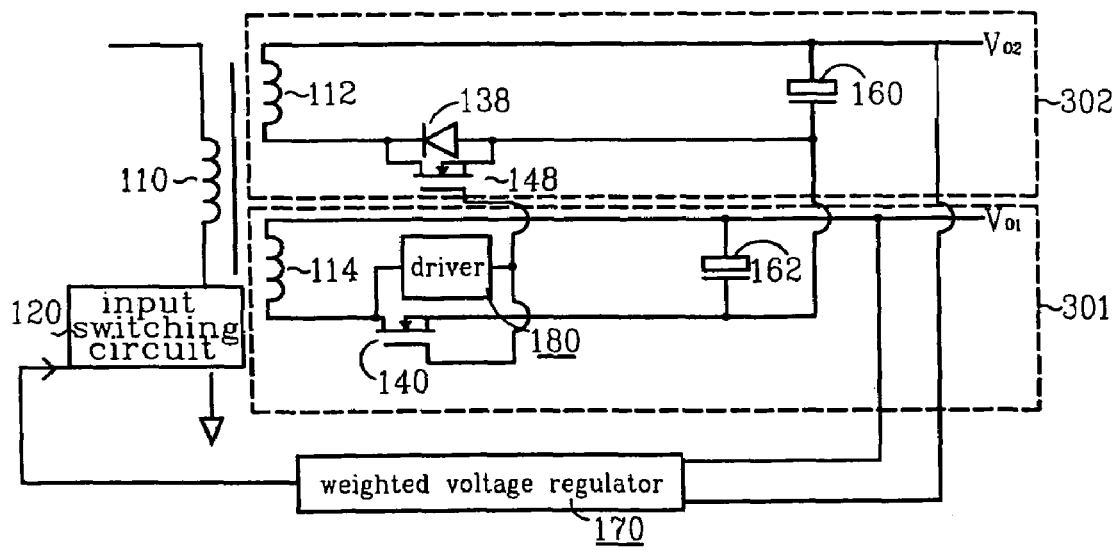
FIG. 10 is a schematic diagram of a two outputs converter with improved cross regulation according to a sixth alternate embodiment of the present invention.

FIG. 10 is a schematic diagram of a two outputs converter with improved cross regulation according to a sixth alternate embodiment of the present invention. The main circuit is a multiple outputs flyback converter. The converter includes a transformer having the primary winding 110, the first secondary winding 114 and the second secondary winding 112. The first output channel 301 is coupled to the first secondary winding 114 for providing a first output voltage Vo1. The first output channel 301 includes the synchronous rectifier MOSFET 140, the driver 180, and the filter capacitor 162. The second output channel 302 is coupled to the second secondary winding 112 for providing a second output voltage Vo2. The second output channel 302 includes a diode rectifier having the diode 138, the switching element 148 as a comparatively smaller current rating MOSFET paralleled with the diode 138, and the filter capacitor 160. The driver 180 drives the MOSFET 140 and the switching element 148. The voltages of the first output Vo1 and the second output Vo2 are regulated by the weighted voltage regulator 170 via a duty cycle control of the input switching circuit 120.

Due to the application of the synchronous rectifier MOSFET 140, the first output channel 301 will always operate with continuous current mode. Also, the second output channel 302 will always operate with continuous current mode even under open load condition with the help of the switching element 148. Therefore, the cross regulation of the first and second output voltages Vo1 and Vo2 will be well satisfied.

Those skilled in the pertinent art will realize that, a derivative art for the converters of FIG. 10 can also be proposed to satisfy multiple outputs converter applications as described in FIG. 9, and are well within the broad scope of the present invention.

Those skilled in the pertinent art will also realize that, the topology of the converter of the present invention can be a forward converter, a half bridge converter, a full bridge converter, and a flyback converter, and are also well within the broad scope of the present invention.

Although the present invention has been described in terms of the presently preferred embodiments, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A multiple outputs converter with improved cross regulation, said converter comprising:
   a transformer including a primary winding, a first secondary winding and a second secondary winding;
   a first output channel including a synchronous rectifier coupled to said first secondary winding for providing a first output voltage;
   a second output channel including a diode rectifier coupled to said second secondary winding for providing a second output voltage;
   a weighted voltage regulator for regulating said first output voltage and said second output voltage;
   a switching element, connected in parallel with a freewheeling diode of said diode rectifier, configured to ensure said second output channel to operate in continuous current mode; and
   a driver connected to said synchronous rectifier for driving said synchronous rectifier and said switching element.

2. The converter as recited in claim 1 wherein said first output channel further comprises a first filter having a first capacitor and a first choke, said second output channel further comprising a second filter having a second capacitor and a second choke, and said first choke is coupled with said second choke.

3. The converter as recited in claim 1 wherein said synchronous rectifier comprises a forward MOSFET and a freewheeling MOSFET.

4. The converter as recited in claim 1 wherein said diode rectifier comprises a forward diode and said freewheeling diode.

5. The converter as recited in claim 1 wherein said diode rectifier is stacked over said synchronous rectifier.

6. The converter as recited in claim 1 wherein said second secondary winding is stacked over said first secondary winding.

7. The converter as recited in claim 1 wherein said switching element is a MOSFET.

8. The converter as recited in claim 7 wherein a drain of said switching element is connected to a cathode of said freewheeling diode and a source of said switching element is connected to an anode of said freewheeling diode.

9. A multiple outputs converter with improved cross regulation, said converter comprising:
   a transformer having a primary winding and a plurality of secondary windings;
   a plurality of output channels for providing a plurality of output voltages, each of said plurality of output channels is coupled to one of said plurality of secondary windings respectively, at least one of said plurality of output channels using a synchronous rectifier while all the other of said plurality of output channels using diode rectifiers, wherein each of said other of said plurality of output channels further comprises a switching element connected in parallel with a freewheeling diode of each of said diode rectifiers, configured to ensure said other of said plurality of output channels to operate in continuous current mode; and
   a weighted voltage regulator for regulating said plurality of output voltages;
   a driver connected to said synchronous rectifier for driving said synchronous rectifier and said switching elements of said other of said plurality of output channels.

10. The converter as recited in claim 9 wherein said switching elements are MOSFETs.

11. The converter as recited in claim 9 wherein a drain of each of said switching elements is connected to a cathode of said respective freewheeling diode and a source of each of said switching element is connected to an anode of said respective freewheeling diode.

12. The converter as recited in claim 9 wherein said synchronous rectifier comprises a forward MOSFET and a freewheeling MOSFET.

13. The converter as recited in claim 9 wherein said diode rectifier comprises a forward diode and said freewheeling diode.

14. The converter as recited in claim 9 wherein said diode rectifiers are stacked over said synchronous rectifier.

15. The converter as recited in claim 9 wherein said plurality of secondary windings are stacked over with each other.

16. The converter as recited in claim 9 wherein the converter is selected from the group consisting of:
   a forward converter;
   a half bridge converter;
   a full bridge converter; and
   a flyback converter.

* * * * *